273-85
11/11/86 09 RE 32,282

United States Patent [19]

Baer

[11] E Patent Number: Re. 32,282

[45] Reissued Date of Patent: Nov. 11, 1986

[54] TELEVISION GAMING APPARATUS

[75] Inventor: Ralph H. Baer, Manchester, N.H.

[73] Assignee: Sanders Associates, Inc., Nashua, N.H.

[21] Appl. No.: 810,538

[22] Filed: Jun. 27, 1977

Related U.S. Patent Documents

Reissue of:

[64] Patent No.: 3,728,480
Issued: Apr. 17, 1973
Appl. No.: 126,966
Filed: Mar. 22, 1971

U.S. Applications:

[63] Continuation of Ser. No. 697,798, Jan. 15, 1968, abandoned.

[51] Int. Cl.[4] ..... A63F 9/22

[52] U.S. Cl. ..... 273/85 G; 273/DIG. 28; 273/1 E; 434/20; 340/707

[58] Field of Search ..... 273/1 E, 85 G, DIG. 28, 273/310–316; 340/707, 721, 723, 724; 434/20, 43, 307

[56] References Cited

U.S. PATENT DOCUMENTS

| | | | |
|---|---|---|---|
| Re. 25,756 | 4/1965 | Balding | 343/11 R |
| 2,455,992 | 12/1948 | Goldsmith et al. | 273/DIG. 28 |
| 2,489,883 | 11/1949 | Hecht | 250/217 CR |
| 2,552,022 | 5/1951 | Watson et al. | 315/26 |
| 2,595,646 | 6/1952 | Doba, Jr. et al. | 328/187 |
| 2,621,246 | 12/1952 | Clayden et al. | 358/183 |
| 2,648,724 | 8/1953 | Enslein | 358/139 |

FOREIGN PATENT DOCUMENTS

| | | | |
|---|---|---|---|
| 1119152 | 12/1961 | Fed. Rep. of Germany | 35/25 X |
| 1211250 | 2/1966 | Fed. Rep. of Germany | |
| 1180470 | 6/1959 | France | 273/DIG. 28 X |

OTHER PUBLICATIONS

Radio & Television News; Aug. 1956, p. 63.
Radio Electronics, May 1956 p. 38.
*Decuscope;* vol. 1, No. 1; Apr. 1962; pp. 1, 2, 4.
Brown, W., De Turk, J., Garner, H., and Lewis, E.; *The MIDSAC Computer;* Univ. of Michigan Engineering Research Institute; Apr. 1954; pp. 1–55.

(List continued on next page.)

[57] ABSTRACT

The present invention pertains to an apparatus [and method], in conjunction with standard monochrome and color television receivers, for the generation, display, manipulation, and use of symbols or geometric figures upon the screen of the television receivers for the purpose of [training simulation, for] playing games[, and for engaging in other activities] by one or more participants. The invention comprises in one embodiment a control unit, *an apparatus* connecting [means] *the control unit to the television receiver* and in some applications a television screen overlay mask utilized in conjunction with a standard television receiver. The control unit includes the control [means] *circuitry*, switches and *other* electronic circuitry for the generation, manipulation and control of video signals which are to be displayed on the television screen. The connecting [means] *apparatus selectively* couples the video signals to the receiver antenna terminals thereby using existing electronic circuits within the receiver to process and display the signals *generated by the control unit in a first state of the coupling apparatus and to receive broadcast television signals in a second state of the coupling apparatus.* An overlay mask which may be removably attached to the television screen may determine the nature of the game to be played or the training simulated. Control units [are] *may be* provided for each of the participants. Alternatively, games[, training simulations and other activities] may be carried out in conjunction with background and other pictorial information originated in the television receiver by commercial TV, closed-circuit TV or a CATV station.

18 Claims, 26 Drawing Figures

U.S. PATENT DOCUMENTS

| | | | |
|---|---|---|---|
| 2,784,247 | 3/1957 | Hurford | 358/183 |
| 2,847,661 | 8/1958 | Althouse | 315/22 X |
| 2,956,116 | 10/1960 | Singleman . | |
| 3,014,724 | 12/1961 | Cryder et al. | 273/DIG. 28 |
| 3,017,625 | 1/1962 | Evans et al. | 340/794 |
| 3,046,676 | 6/1962 | Hermann et al. | 35/25 |
| 3,122,607 | 2/1964 | Balding | 340/805 |
| 3,135,815 | 6/1964 | Spiegal | 35/10.4 |
| 3,151,248 | 9/1964 | Glaser | 273/101.1 |
| 3,158,858 | 11/1964 | Ragen et al. | 340/720 |
| 3,189,889 | 6/1965 | Bridgett | 340/324 A |
| 3,241,120 | 3/1966 | Amdahl | 340/709 |
| 3,249,796 | 5/1966 | Moffitt | 315/377 |
| 3,319,227 | 5/1967 | Evans, Jr. | 340/806 |
| 3,333,147 | 7/1967 | Henderson | 315/367 |
| 3,334,236 | 8/1967 | Bacon | 250/201 |
| 3,401,331 | 9/1968 | Mussulman | 324/20 R |
| 3,404,222 | 10/1968 | Rupley | 358/10 |
| 3,431,458 | 3/1969 | Christopher | 315/367 |
| 3,462,639 | 8/1969 | French | 315/367 |

OTHER PUBLICATIONS

Bauer, W. F., and Carr III, J. W.; "On the Demonstration of High-Speed Digital Computers"; *Journal of the Association for Computing Machinery;* Oct. 1954; pp. 177-182.

Gibbons, R.; "Meet MIDAC and MIDSAC: Dice, Pool Shooting Fools"; *Chicago Tribune;* Jun. 1954; p. 1.

"Electronic Pool Shark"; available as of Sep. 30, 1967; p. 1.

*Oklahoma City Times;* "Pool Games Speeding Computers' Progress"; available as of Sep. 30, 1967; p. 1.

*Information Display;* "A High-Precision Display System or Command and Control"; Jul./Aug. 1967; pp. 32-36.

*Information Display;* "Using a Standard Television Monitor as an Alpha-Numeric Display;" May/Jun. 1967; pp. 59-61.

*Supplement Digital Computer Newsletter;* vol. 6, No. 3; Jul. 1954; pp. 139, 143, 144.

*Computers and Automation;* vol. 3, No. 7; Sep. 1954; pp. 1, 3, 26, 28.

*The Journal of the Association for Computing Machinery;* Jul. 1954; p. 137.

*RCA Laboratories Open House and 25th Anniversary Brochure;* Sep. 30, 1967; pp. 1-8.

*Electronics;* "Outline Generation for Educational Television"; Apr. 3, 1959; pp. 52-53.

Southworth, G.; "A New Method of Television Waveform Display"; *Journal of the SMPTE;* available after May 5, 1966; pp. 847-850.

Southworth, G.; "A Television Bar Graph Generator"; *Journal of the SMPTE;* Feb. 1966; pp. 99-102.

Merte, P.; "Long Haul Television Signal Transmission"; *Journal of the SMPTE;* Sep. 1966; pp. 850-855.

*Electronics;* "TV Dissolve Wiper"; Sep. 6, 1963; pp. 40-42.

*Electronics;* "Converter Produces Television Bar Display;" Nov. 3, 1961; pp. 45-47.

*Radio-Electronics;* "Something New in Color Generators"; May 1967; pp. 42-44.

*Grundig Technische Informationen;* Apr. 1964; p. 752.

*Funk und Ton;* 1954; pp. 179-186.

*Radio-Mentor;* 1964; pp. 938-939.

*Decus Proceedings;* "Spacewar! Real-Time Capability of the PDP-1"; Graetz, J. M.; 1962; pp. 37-38.

*Primary Examiner*—Richard C. Pinkham
*Assistant Examiner*—MaryAnn Stoll Lastova
*Attorney, Agent, or Firm*—Louis Etlinger; Richard I. Seligman

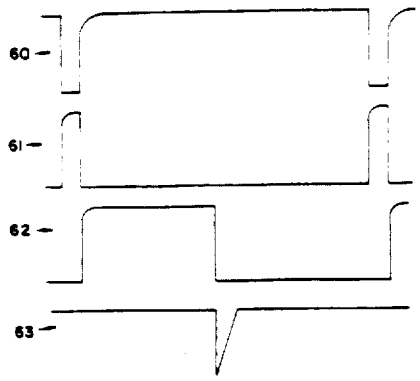
FIG. 6A
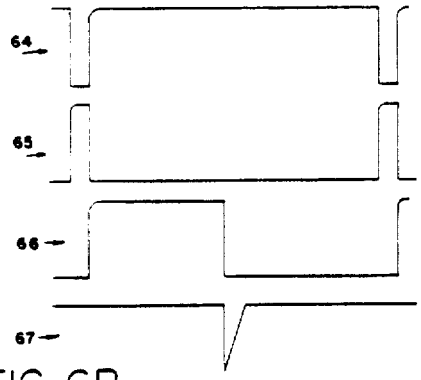
FIG. 6B
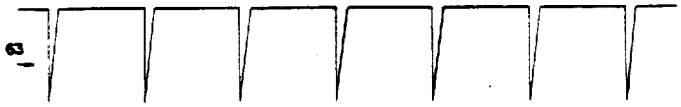

TELEVISION GAMING APPARATUS

Matter enclosed in heavy brackets [ ] appears in the original patent but forms no part of this reissue specification; matter printed in italics indicates the additions made by reissue.

This is a continuation of application Ser. No. 697,798 filed Jan. 15, 1968 now abandoned.

BACKGROUND OF THE INVENTION

The invention relates to an apparatus [and method] by means of which standard television receivers can be utilized as active rather than passive instruments. this is accomplished by certain embodiments having participants manipulate controls of a control unit connected to the television receiver to cause a symbol, such as a rectangle, bar, "dot" or a pair of dots to be displayed upon the television screen by means of which the participants can play a variety of games [, participate in simulated training programs, as well as carry out other activities]. By way of example, modified versions of the well-known game of checkers may be played by two participants by placing an appropriate mask representing the checker board upon the screen of the television receiver. [For a simulated training program, "dots" displayed on the TV screen could represent ships which would be maneuvered by operating manipulating controls.]

Heretofore, color and monochrome television receivers have been used by the home and the other viewers only as passive devices; i.e., the television receiver is used only as a display means for programming originating at a studio. The viewer is limited to selecting the presentations available for viewing and is not a participant to the extent that he can control or influence the nature of, or add to the presentation displayed on the receiver screen. A standard receiver is employed with auxiliary equipment to provide an active form of home entertainment. Since most homes are equipped with television receivers, the only expense required to provide added family enjoyment is the expense of a control unit of one type or another.

It is, therefore the primary object of the present invention to provide an apparatus and methods for displaying video signals upon the screen of a television receiver, where some or all of the video signals are both generated and controlled by the viewer.

It is another object of the present invention to provide an apparatus and method wherein a standard color or monochrome television receiver is utilized as an active instrument [for simulated training programs and] to play various types of games involving one or more participants.

It is a further object of the present invention to provide a device whereby an individual may pit his alertness, skill, manual dexterity and visual acuity on automatically controlled video displays.

It is still another object of the present invention to provide an apparatus which will also provide visual indication of the results of the games played [and the simulated training programs.]

It is yet a further object of the present invention to provide an apparatus which will generate "dots" or other geometric figures such as squares, rectangles, bars, stripes, etc. [Which] *which* may be controlled by one or more participants for playing various types of games [and for training simulation] by the display and utilization of the "dots."

It is yet another object of the present invention to provide an apparatus which may allow one or more participants to use a standard television set while receiving background and other pertinent pictorial information from a cooperative commercial TV, closed-circuit TV, or CATV station, thus combining or alternating studio and home-generated information on the TV screen.

It is still another object of the present invention to allow the use of a standard TV set for gaming [or other activities] without the need for any kind of internal electrical connection to the TV set for the introduction of video and/or chroma signals, connections being required to be made only to the externally accessible antenna terminals.

It is still another object of the present invention to provide for interrogating a standard TV receiver through an optical photosensor in a manner allowing the identification of a suitably time-or frequency-coded message, not interpretable by the unaided eye, such message having been originated in the TV viewers equipment by a cooperative commercial TV, closed-circuit TV or CATV station.

It is still a further object of the present invention to provide apparatus for decoding messages on a TV screen.

SUMMARY OF THE INVENTION

In accordance with one embodiment of the present invention a television gaming apparatus is provided for generating video signals in accordance with the standardized television format, which signals may be controlled by an individual operator by means of a joystick or other manually operative means. The television gaming apparatus comprises a control box having enclosed therein all the necessary electronic circuits to produce video signals which are compatible with standard television receivers, both monochrome and color.

The control box has video signal control means mounted thereon for easy access and connecting means are provided for *directly and selectively* coupling the video signals generated within the control box to the television receiver *in a first state of the connecting means and the television receiver is capable of receiving broadcast television signals in a second state of the connecting means.* There is also provided suitable overlay masks which are adapted to be removably secured upon the television screen. These masks permit playing of games [and training simulation] which are adaptable to display upon a television screen.

By way of illustration, the television gaming apparatus can be used for electronic target shooting by providing a gun having a photo-electric cell which is activated when a trigger is depressed. Thus, when the gun is aimed at a "dot" displayed on the television screen, which "dot" serves as the target, and the trigger is depressed, a hit will be indicated directly on the television screen by a visual display when the photoelectric cell is in alignment with the "dot." The "dot" which serves as the target may be either fixed or moveable and can be swept across the screen in a predetermined or random fashion, at either a fixed or variable rate, either manually or automatically.

By way of further illustration, games may be played in which a cooperative TV station (commercial, closed-circuit or CATV) provides background data such as scenery for a simulated turkey-shoot game, or such as checkerboard game backgrounds, time-left-to-play-clocks and innumerable others designed to enhance the appeal of the activity. A cooperative TV station can also provide targets for a target shooting game as well as messages to be decoded. For example, tests questions could be displayed on the TV screen with a multiple set of answers whereby the correct answer is coded in such a manner that a photocell circuit would detect the coding signifying selection of the correct answer.

From the above illustrations it will be apparent to those skilled in the art, that the present invention exhibits a great latitude of versatility.

BRIEF DESCRIPTION OF THE DRAWINGS

The aforementioned and other objects, features and advantages of the present invention will become more apparent from the following detailed description thereof when considered in conjunction with the drawings wherein:

FIGS. 6A-6F are waveforms (not drawn to scale) illustrating operation of the schematics of FIG. 5;

DESCRIPTION OF PREFERRED EMBODIMENTS

Figure 1A:
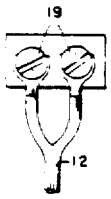
FIG. 1A is a sketch illustrating the manner in which the components of the embodiment of FIG. 1 are connected.
Figure 1:
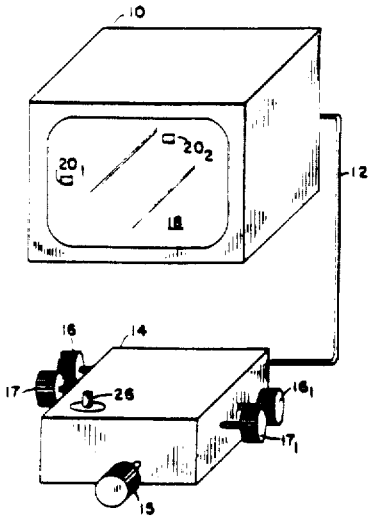
FIG. 1 is a pictorial view illustrating the principal components of one embodiment of the invention.

The principal components of one embodiment of a television gaming system configured according to the invention are illustrated in FIG. 1 which is a pictorial view showing a television receiver 10, a control unit 14 and means 12 for connecting control unit 14 to receiver 10. The television receiver 10 employed can be any of the standard commercially available models that are generally used for home entertainment. Either a monochrome or color television set may be used with the present invention since the basic principles of the invention apply to both types. The connection means 12 is in this embodiment a shielded cable, for example, shielded twin lead and is attached to the antenna terminals of receiver 10 in conventional fashion (see FIG. 1A). *This connection is a non-destructive connection (screw connection in the instant example) which readily allows a user to switch from using the television receiver for playing games to watching broadcast programs and vice versa without requiring the destruction of a permanent connection such as a soldered connection.*

Control unit 14 generates video signals shown as "dots" $\mathbf{20_1}$ and $\mathbf{20_2}$ which are positioned on the receiver screen 18 by knobs 16, 17, and $\mathbf{16_1}$, $\mathbf{17_1}$, respectively. In this embodiment the "dots" 20 are squares or rectangles. However, any geometric shape is applicable. Knob 16 controls the vertical position of dot $\mathbf{20_1}$ while knob 17 controls the horizontal position thereof. Thus, it can be seen that the dot $\mathbf{20_1}$, may be positioned at any point on the screen by the proper manipulation of knobs 16 and 17. Dot 20, is positioned in like manner by knob $\mathbf{16_1}$, $\mathbf{17_1}$. A reset switch 26 is shown on the control unit 14 and is used to reset the picture on the television screen. For example, a game may be played in which one dot is to be positioned over the other and when this is accomplished one dot will disappear when a monochrome set is used, while in a color set, the dot will disappear and the background will change color. When games of this nature are played, a reset means is required before play can be resumed. Reset switch 26 performs this function.

Figure 1B:
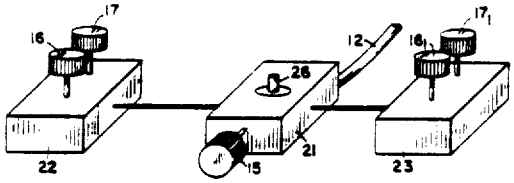
FIG. 1B is a pictorial view illustrating an alternate embodiment for the control unit of FIG. 1.

A knob 15 controls background color for color TV receiver applications. Alternatively, control unit 14 may be broken up into a master control unit containing the electronic circuits and individual control units containing control knobs 16, 17 and $\mathbf{16_1}$, $\mathbf{17_1}$, whereby each participant may operate from a position not proximate the other and so not to interfere with other players. This is illustrated in FIG. 1B wherein control unit 14 is broken up into a master control unit 21 and individual control units 22 and 23. The master control unit 21 contains the electronic circuitry found in control unit 14 and controls 26 and 15. Knobs 16, 17 and $\mathbf{16_1}$, $\mathbf{17_1}$ which position the dots $\mathbf{20_1}$ and $\mathbf{20_2}$ are situated on individual control units 22 and 23 respectively.

The knobs 16, 17 may be combined into a single joystick permitting control of the horizontal and vertical dot positioning by a single control means.

Rather than provide a separate control unit, the control unit could be built into the television receiver as a constituent part thereof and the receiver sold as both an active and passive home entertainment system.

A typical sequence of steps to play a game using the present invention would be as follows: 1. Attach connection means 12 to TV set 10 at antenna terminals 19 if not already attached; 2. turn TV set on; 3. select the proper channel on the set for the control unit being used; 4. apply power to the control unit; 5. attach a mask on the face of the TV screen, if required for the game to be played; 6. begin the game.

Figure 2:
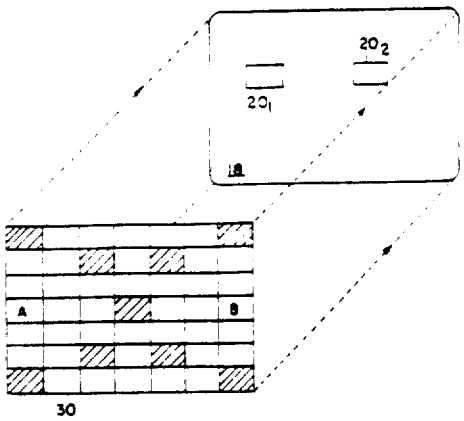
FIG. 2 is a sketch illustrating a TV screen and overlay mask as employed in the embodiment of FIG. 1.

Referring now to FIG. 2, a television screen 18 is illustrated having two "dots" $\mathbf{20_1}$ and $\mathbf{20_2}$ displayed. An overlay mask 30 of some type of transparent material such as plastic or the like, having some type of pattern, picture or other illustration pertaining to the particular game to be played is shown in a lifted position. Prior to engaging in a game, the overlay mask 30 would be temporarily attached to television screen 18 and in such close proximity to it as not to create any distortion when viewed with reference to the dots 20. One type of overlay mask could be a checkerboard pattern to be used for playing a modified game of checkers. Still another pattern could be a maze type, with the object of the game being to escape within a specified time. These are but a few of the many games that can be adapted for use with the present invention.

Alternatively, rather than employ overlay mask 30, the pattern to be provided could be displayed directly on the screen 18. The pattern could be broadcast by TV stations or alternatively could be sent to a non-used channel over closed-circuit or CATV lines. This embodiment is described in greater detail hereinafter with respect to FIGS. 7 and 8.

The control unit 14 will now be described in detail by referring to the block diagram shown in FIG. 3. The timing for the television gaming system is established within the control unit by a horizontal sync generator 31 and a vertical sync generator 32.

The horizontal sync generator 31 employed in this embodiment is a multivibrator whose output is a series of pulses rather than a square wave. The repetition rate of these pulses is the standard horizontal scanning frequency used in commercial television receivers. The positive sync pulse output 81 of the horizontal sync generator 31 is simultaneously applied to a first "dot" generator 34, a second "dot" generator 35 and a chroma generator 33 (in color TV applications). The negative sync pulse output 82 of the horizontal sync generator 31 is applied directly to a summing amplifier-modulator 37. The "dot" generators 34 and 35 when triggered by horizontal sync generator 31 generate a pulse which is the horizontal video information portion of the television composite signal that forms the "dots" 20 on the television receiver screen 18. The manual control knobs 16, 17 and $16_1$, $17_1$ on the control unit are attached to the shafts of potentiometers 86, 92 and 95, 99 in the dot generator circuits of the "dot" generators 34 and 35 respectively (see FIGS. 5C and 5D). Alternatively, a single control such as a joystick could be coupled to knobs 16, 17 and a second joystick coupled to knobs $16_1$, $17_1$. Adjustment of these potentiometers establishes the position of the "dots" on the television screen.

The vertical sync generator 32 is coupled to the first and second symbol or "dot" generators 34 and 35 and triggers the "dot" generators to generate a pulse which is the vertical video information portion of the composite television signal. The combination of the horizontal and vertical signals form a "dot" on the television receiver screen. There are two manual control knobs for each "dot". One of the knobs controls the horizontal pulse position while the other controls the vertical pulse position. The output of the "dot" generator which is the delayed horizontal pulses that are gated by the delayed vertical pulse, describes the location of the "dots" on the television screen. The horizontal and vertical video information from the first and second "dot" generators 34 and 35 is summed together in the summing network of summing amplifier-modulator 37. The summing network is a resistor matrix which sums all the signals presented to one point. Thus the composite video information is formed. The composite video information is then coupled to the modulator portion of summing amplifier-modulator 37 and to r-f oscillator 38 which modulates the video information with the carrier to generate the modulated RF signal. The RF signal is then coupled to the television antenna terminals 19. The RF signal that is present at the antenna terminals is detected and processed by the television receiver in the standard manner and is displayed upon the screen. The two controllable "dots" are the means by which games may be played.

Alternatively the video signal could be applied internally to the receiver without rf carrier modulation.

The "dot" coincidence detector and crowbar circuit 40 receives an input from both the first and second "dot" generators 34 and 35 taken at outputs 94 and 98 thereof, respectively (see FIG. 5). When the "dots" $20_1$ and $20_2$ are coincident, the first "dot" generator 34 is turned off by the "dot" coincidence detector and crowbar circuit 40. Thus, when one "dot" is superimposed upon the other, one of the "dots" will disappear.

A variety of games may be adapted to use this particular aspect of the television gaming system. For example, a game of fox and hounds may be played with one "dot" representing the fox and other the hounds. When the hounds catch the fox, the fox's "dot" disappears indicating a catch. Any game requiring an indication of when contact is made between two objects may be adapted to this concept.

The chroma generator 33 is used when the control unit 14 is coupled to a color television receiver. Chroma generator 33 may be omitted for monochrome applications. The gaming system for color operation is the same as that for monochrome sets with the exception that the background color in the color receivers may be controlled. A color control knob 15 (see FIG. 1) is provided on control unit 14 and is coupled to a potentiometer within the chroma generator 33 by which means the background color may be varied throughout its entire color spectrum. The horizontal sync generator 31 provides the trigger signal to the chroma generator 33 whose output is then summed in the summing network of the summing amplifier-modulator 37 with the other portions of video information. The resultant composite video information is then modulated with the carrier in the modulator and r-f oscillator 38. The RF signal is then coupled as before to the television receiver antenna terminals 19 and is detected, processed and displayed in the standard manner. *It should be noted that neither the synchronization system nor the chroma system conform to NTSC standards but is much simplified.*

One game which may be played employing the concepts of this invention is target shooting. A "toy" gun containing a photocell is electrically coupled to the control unit.

When a game is played using the target gun, also called a "light-gun," hits are shown on the screen by having one of the "dots" disappear. Signals detected by a target gun circuit 36 are used to trigger the crowbar circuit portion of "dot" coincidence detector and crowbar circuit 40, which turns off the first dot generator 34. Thus, one of the dots will disappear indicating a hit. The operation of the target gun circuits will be described in greater detail with reference to FIG. 4.

The power source 41 is preferably a [battern] *battery* and provides the necessary power to operate the various circuits.

Figure 3:
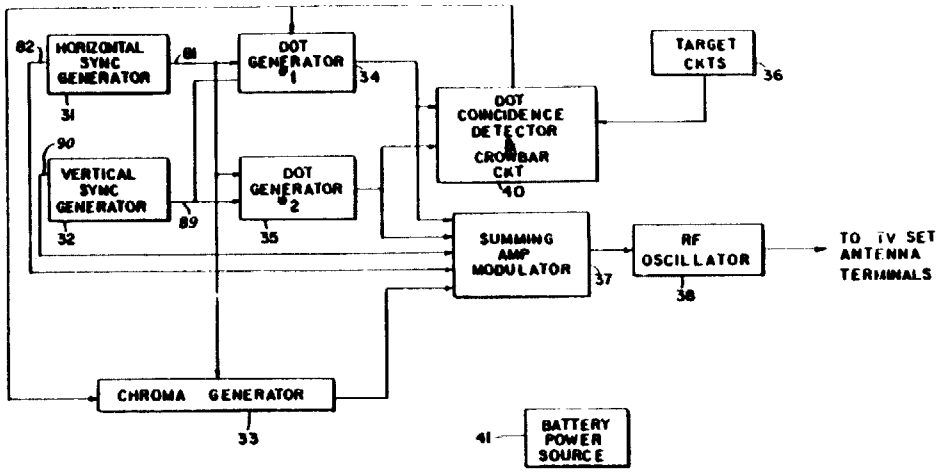
FIG. 3 is a block diagram of the control unit of FIG. 1.

Referring now to FIG. 5, there is illustrated thereby schematics of the blocks of FIG. 3. The schematics are described in conjunction with the waveforms of FIG. 6. Note that the circled capital letters A, B . . . designate connection points, that is A is coupled to A, B to B, etc. The horizontal oscillator 31 of FIG. 5A is an astable multivibrator that operates at approximately 15.75 KHz and generates the horizontal sync and timing pulses that are used within the control unit and the television receiver. One output signal taken at point 81 is a positive sync pulse which in one embodiment is approximately 8 volts in amplitude and has a pulse width of 4 microseconds. A second output signal taken at point 82 is a negative sync pulse which also is approximately 8 volts in amplitude and has a pulse width of 4 microseconds.

Figure 5A:
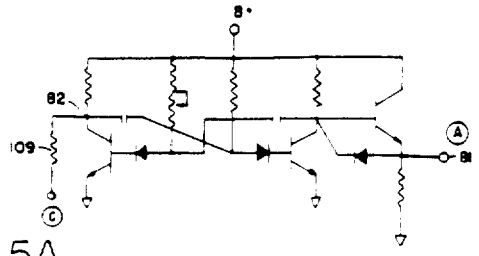
FIGS. 5A-5G are schematics of the blocks of FIG. 3.
Figure 5B:
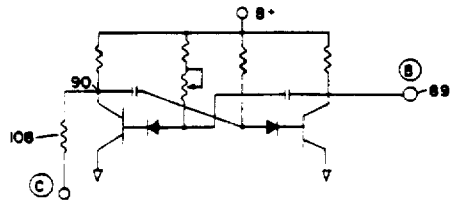

The vertical oscillator 32 of FIG. 5B is an astable multivibrator that operates at 60 Hz and provides positive 89 and negative 90 vertical sync pulses of approximately 8 volts amplitude and 1 millisecond duration.

Figure 5C:
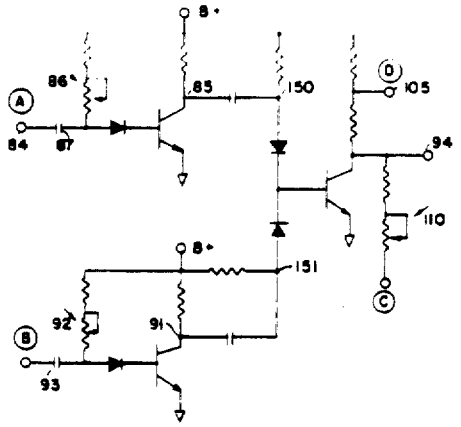
Figure 5D:
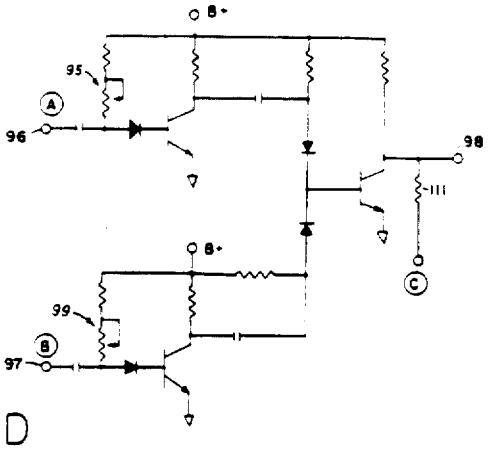

The first "dot" generator 34 is illustrated in FIG. 5C and is comprised of an "and" gate, and horizontal and vertical delay and pulse-forming circuits. The delayed horizontal and vertical pulses (positive sync pulses) are AND-gated together to form the video information which produces one "dot" on the television screen. Both delay and pulse-forming circuits utilize the positive sync pulse transistor of their respective oscillators as its input transistor. The positive sync pulse from point 81 of the horizontal oscillator is used to trigger the horizontal delay and pulse-forming circuits portion of the first dot generator. When the positive sync pulse, taken at point 81, is applied at point 84, the pulse that appears at the output of the delay and pulse-forming circuit point 85 is delayed by the time constant established by the setting of potentiometer 86 and capacitor 87. The delay and pulse-forming circuit output passes through a pulse shaper having an R-C time constant of very short duration relative to the horizontal oscillator frequency. The output of the pulse shaper is taken at a point 150. The time delay may be varied from 9 microseconds to 57 microseconds which is substantially the entire range of the horizontal sweep period. The pulses which are generated by the horizontal oscillator, the horizontal delay and pulse-forming circuit and the pulse shaper, are shown in FIG. 6A as waveforms 60, 61, 62 and 63. Waveform 60 represents the negative horizontal sync pulses taken at point 82; waveform 61 represents the positive horizontal sync pulses taken at point 81; waveform 62 represents the output from the delay and pulse-forming circuit taken at point 85 and waveform 63 represents the output from the pulse shaper taken at point 150.

The positive sync pulse taken at point 89 of vertical oscillator 32 is used to trigger the vertical delay and pulse-forming circuit portion of the first dot generator. The output signal appears at point 91 after a time delay which is determined by the setting of potentiometer 92 and capacitor 93. The delay and pulse-forming circuit output passes through a pulse shaper having an R-C time constant of very short duration relative to the vertical oscillator frequency. The output of the pulse shaper is taken at point 151. The time delay may be varied from 1.5 milliseconds to 15.5 milliseconds which is substantially the entire range of the vertical sweep period. The pulses which are generated by the vertical oscillator, the vertical delay and pulse-forming circuit, and the pulse shaper are shown in FIG. 6B as waveforms 64, 65, 66, and 67. Waveform 64 represents the negative vertical sync pulses taken at point 90; waveform 65 represents the positive vertical sync pulses taken at point 89; waveform 66 represents the output from the delay and pulse-forming circuit taken at point 91; and waveform 67 represents the output from the pulse shaper taken at point 151.

Figure 6C:
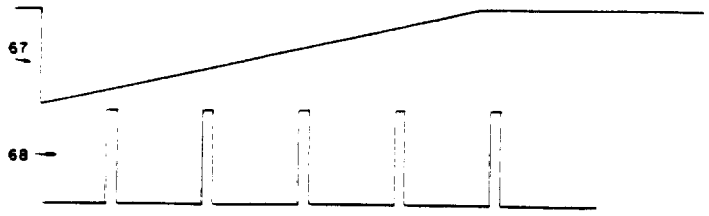

The video information that will be displayed on the television screen 18 as a "dot" 20 is the summation of the outputs of the horizontal and vertical delay and pulse-forming circuit. When the delayed vertical pulse is at point 151, the delayed horizontal pulses at point 150 will be gated through to the first "dot" generator output 94. The waveforms of FIG. 6C illustrate the signals 63 and 67 taken at points 150 and 151 respectively in expanded form and the output signal from the first "dot" generator 68 taken at point 94. The signal 68 which is present at the first "dot" generator output 94 contains the horizontal and vertical data that will be processed by the television receiver and displayed as a "dot" $20_1$ on the screen.

The settings of potentiometers 86 and 92 control the horizontal and vertical position of the "dot" $20_1$ on screen 18.

The second "dot" generator 35 (see FIG. 5D) is configured exactly as the first "dot" generator and operates in the same manner to provide video information for the second "dot" $20_2$. The input to the horizontal delay and pulse-forming circuit portion of the second "dot" generator is provided at a point 96. The input to the vertical delay and pulse-forming circuit portion of the "dot" generator is provided at a point 97. The output of the second "dot" generator is taken at a point 98.

Figure 5E:
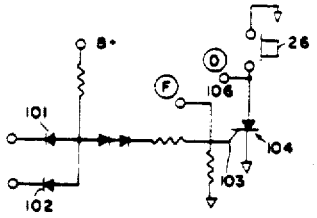

The "dot" coincidence and crowbar circuit 40 illustrated in FIG. 5E is connected to the outputs of the first and second "dot" generators. The cathode end of a diode 101 is connected to the output 94 of the first "dot" generator while the cathode end of a diode 102 is connected to the output 98 of the second "dot" generator. When the outputs of both "dot" generators coincide, a positive signal will be applied to the gate 103 of a silicon controlled rectifier (SCR) 104. The cathode of SCR 104 is tied to ground, while the anode thereof is connected at a point 106 to point 105 in the first "dot" generator. The SCR 104 will turn on and clamp point 105 of the first "dot" generator to ground. Thus, the output of the first "dot" generator will become zero as long as SCR 104 is conducting, causing the first "dot" on the television screen to disappear. After the "dots" are made non-coincident, the SCR 104 may be reset by momentarily depressing reset switch 26, which removes the ground from point 105 of the first "dot" generator, allowing the first "dot" to reappear on the television screen.

Figure 5F:
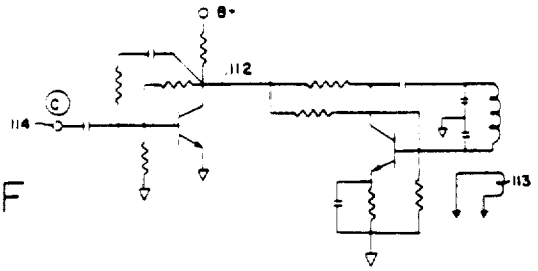
Figure 6D:
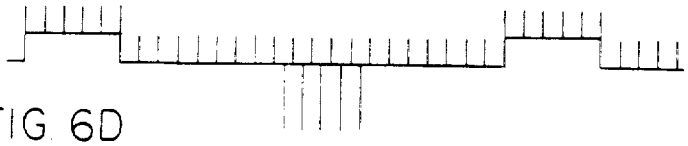

The modulator and r-f oscillator illustrated schematically in FIG. 5F is coupled by a resistive network comprising resistive element 108-111 (see FIGS. 5A-5D) to the negative sync pulses of the horizontal and vertical oscillators and the output signals of the first and second "dot" generators. The r-f oscillator which operates at the selected television channel carrier frequency is collector-modulated by the output of the summing amplifier taken at point 112. The composite video signal which is inductively coupled to pickup coil 113 is coupled to the television receiver antenna terminals 19. The composite video signal is shown in FIG. 6D.

Figure 5G:
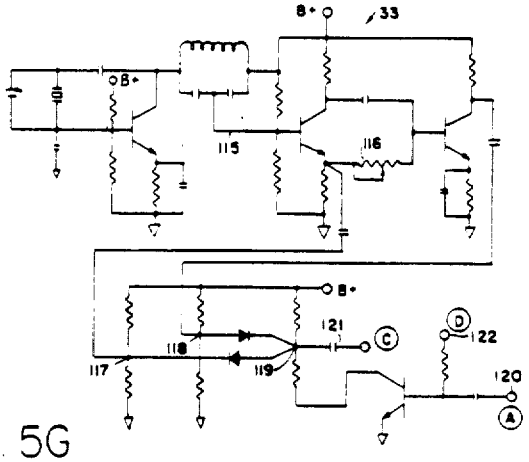
Figure 6E:
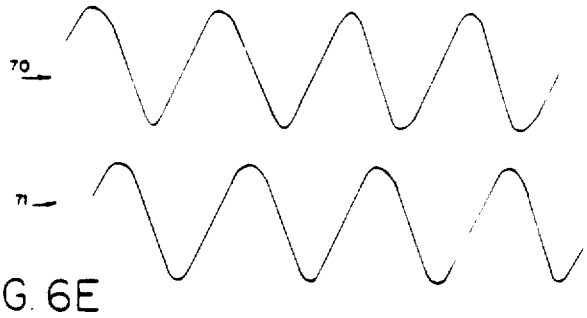
Figure 6F:
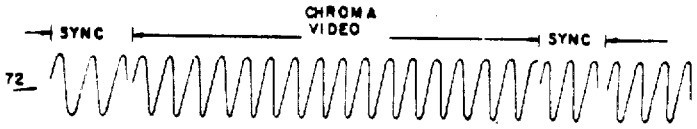

The chroma generator 33 illustrated in FIG. 5G is used only when the control unit 14 is coupled to a color television receiver and is comprised of a crystal-controlled oscillator, a variable phase shifter and an OR gate. The output of the crystal-controlled oscillator which operates at 3.579545 MHz is taken at point 115. The phase shifter is variable over the approximate range of 0°-180° by a potentiometer 116. The reference phase signal (0°) 70 is coupled to point 117. The variable phase signal 71 is coupled to point 118. These signals are shown in FIG. 6E and are displaced with respect to one another by the amount set in the phase shifter by potentiometer 116. The output signal of the chroma generator developed at point 119 is comprised of a chroma sync burst and the chroma signal. The composite chroma signal 72 which is the output of the chroma generator is shown in FIG. 6F. The chroma sync burst is the 0° phase reference signal. The chroma signal is the variable phase signal whose phase is compared by the television receiver against the chroma sync burst. The phase difference between the two signals determines the color to be displayed on the screen. The positive sync pulse from point 81 of the horizontal oscillator is used to gate 0° phase reference signal to point 119. The trailing edge of the positive going pulse at point 120 gates approximately 3-5 microseconds of the 0° phase referenced to point 119 to become the chroma sync burst. The composite color information is summed to the modulator input 114 by capacitor 121. The total composite video signal including the color information is then modulated, as explained before for the monochrome signal, with the carrier and coupled to the television antenna terminals 19.

Figure 8:
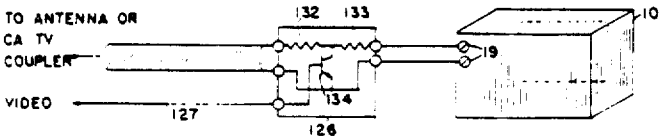
FIG. 8 is a sketch illustrating apparatus for modulating a received TV signal by a video and/or chroma signal generated by the control unit of FIG. 1.

Alternately the video and/or chroma signals may be applied to the crowbar modulator 126 of FIG. 8. (This will be described hereinafter).

When the gaming system is being used in either the target gun or "dot" coincident mode with a color TV receiver, the background color will change when the "dot" disappears from the television screen. The anode of SCR 104 of the coincidence detector and crowbar circuit 40 which is connected to point 105 of the first "dot" generator to make the "dot" disappear is also connected to point 122 of the chroma generator. When the chroma generator is adjusted for a red background, the background will change to blue when point 122 is clamped to ground by SCR 104. The SCR 104 will be fired either by coincidence of the "dots" or by alignment of the photo cell in the target gun with the target "dot".

Figure 4:
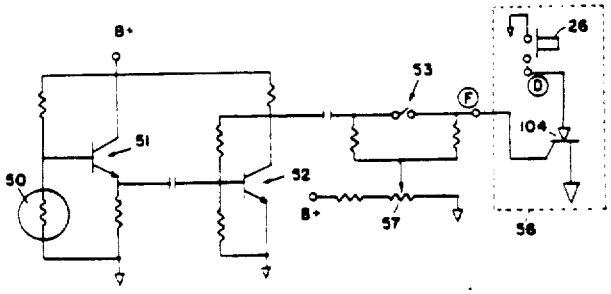
FIG. 4 is a schematic illustrating the electronics for a target shooting game.

Turning now to FIG. 4, the target gun circuits 36 are shown schematically. When the target gun is pointed at the target "dot" on the television screen, a photocell 50 mounted at the end of the target gun barrel will detect the intensity modulated "dot." The detected signal is amplified by transistors 51 and 52. When the gun trigger switch 53 is closed, the amplified detected signal is applied to the gate electrode of a silicon controlled rectifier (SCR) 104, which will file SCR 104. The SCR 104 now clamps the output of the "dot" generator 34 to ground and the "dot" $20_1$ will disappear. Whether the first or the second "dot " is used as a target does not matter, since a hit will be indicated by the disappearance of the first "dot". If only one "dot" is to be displayed on the screen as a target, the first "dot" would be used. A reset button 26 is provided to make the target reappear after a hit has been scored. The portion of the circuit appearing within the dashed lines 56 is part of the "dot" coincidence and crowbar circuit 40.

An adjustment is provided by means of potentiometer 57 whereby the threshold level of photo cell 50 may be adjusted such that only when the gun is properly aligned with the target will the "dot" disappear. This procedure assures that false hits due to stray or scattered light from the room will not be scored. The setting should be made so that SCR 104 will now be triggered by the brightness of the room but only the intensity of the displayed "dot."

As previously mentioned, this invention may be employed in conjunction with information originating from a cooperative station such as a commercial TV, a closed-circuit TV or a CATV station. In these embodiments means are necessary for extracting the horizontal and vertical synchronization pulses from the TV receiver which is receiving a signal from a cooperative station. The horizontal and vertical synchronization pulses could be obtained from within the TV receiver directly. However, this necessitates making electrical connections to the internal circuitry of the TV receiver. Preferably, the apparatus illustrated in FIG. 7 is used to derive the synchronization pulses.

Figure 1C:
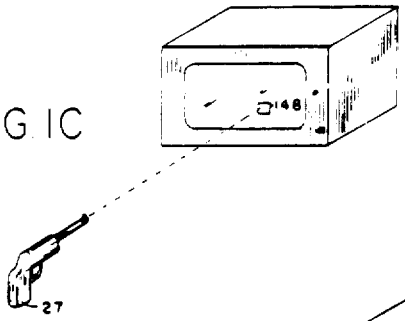
FIG. 1C is a sketch showing a "light-gun" containing a photocell and electronic circuits.
Figure 1D:
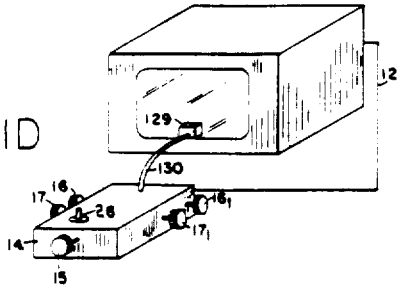
FIGS. 1D and 1E are sketches illustrating the manner in which the components of the embodiment of FIG. 1 may be connected when used with a cooperative TV station.

A device 129 is positioned in front of the receiver and attached to it by, for example, a suction cup at approximately the center bottom edge of the CRT glass face (see FIG. 1D). Device 129 contains both a photocell 128 and a pickup coil 123 responding broadly to 15,570 Hz. These devices pick up a 60 cycle signal component provided by a white stripe at the bottom of the CRT, (generated by the cooperative station) and a radiated 15,570 horizontal scan signal, respectively. These signals are applied via a cable 130 to a pair of amplifiers 127 (vertical) and 124 (horizontal) and fed to a pair of pulse shapers 125 (vertical) and $125_1$ (horizontal). This yields synchronization pulses which duplicate in rate and phase those transmitted. Applying these pulses to points 82 and 90 in FIGS. 5A and 5B allows locking the horizontal and vertical oscillators into sync with the transmitted signals. Consequently, all of the functions previously described, such as the generation of "dots" for checker type games, target shooting, chase games and all other functions available to control by the "viewer," may now be overlaid the transmitted TV picture. Modulation in this mode of operation is accomplished by the "crowbar" modulation circuit 126 of FIG. 8.

In this Figure, use is made of an attenuator consisting of two series resistors 132 and 133 and a transistor 134 acting as a variable shunt resistor. Biasing this transistor sufficiently into conduction by applying modulation to its base, saturates the transistor, momentarily reducing the RF signal going from the antenna to the TV receiver antenna terminals 19. This corresponds to carrier reduction, which is negative modulation and is equivalent to generating a video signal going from black to white and back to the black level. Chroma signals can also be applied to the crowbar transistor modulator in the same fashion.

Figure 7:
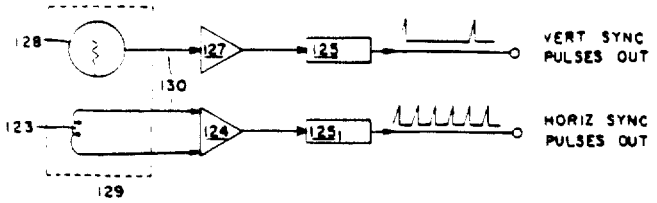
FIG. 7 is a schematic illustrating the method of extracting horizontal and vertical synchronization pulses from a TV receiver without making internal connections, when using a signal broadcast by a cooperative TV station.

Note that the combination of apparatus described in FIGS. 7 and 8 describe a mode of interacting with a transmitted TV signal without requiring the attachment of connections to the internal circuitry of the TV receiver.

As mentioned above, the invention may be employed in conjunction with a cooperative TV station such as commercial TV, closed-circuit TV and CATV (community antenna television). In this mode the invention may be employed for target shooting or for decoding messages on a TV screen, such messages being the result of transmission from the cooperative station, as for example testing with coded answer supplied. Other transmissions can be transmissions from organizations offering services to the [equipped viewer where the services offered may be typically Consumer Products Buying Recommendations, Stock "Buy-Sell-Hold" recommendations and others involving the presentation of valuable information available to the] viewer equipped in accordance with this invention.

Figure 9:
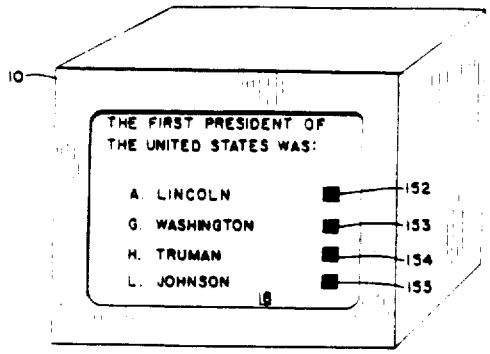
FIG. 9 is a sketch illustrating the TV screen of a receiver employed in a coded information mode.
Figure 10:
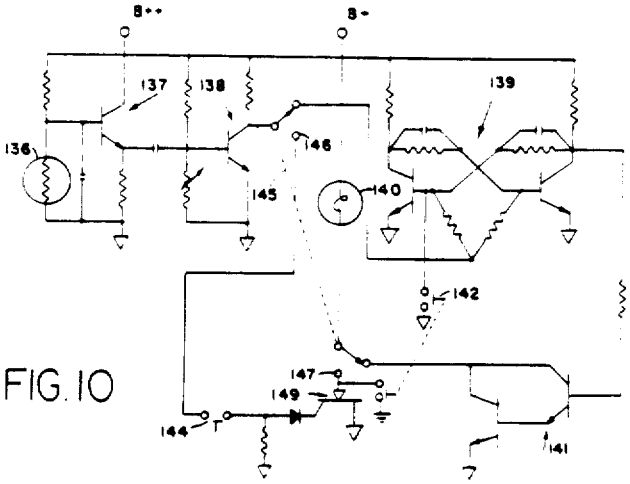
FIG. 10 is a schematic of a decoder used to decode the information present on the TV screen of FIG. 9.

In FIG. 10 there is illustrated a combination target shooting and decoding apparatus. The decoding portion thereof is described in connection with the sketch of FIG. 9. Although the circuit shown is used for both decoding and target shooting it will be obvious that certain of the components can be eliminated to provide either of the functions alone.

The information is presented on the TV screen in such a manner that a portion thereof is coded. For example, FIG. 9 illustrates using the presentation for testing. The question and a group of possible answers is presented on TV screen 18 as illustrated with symbols 152–155 shown next to each answer. One of the symbols (in the example shown 153) is coded in such a manner that it will trigger the decoder of FIG. 10. For example, symbols 152, 154 and 155 may flash 60 times whereas the correct answer symbol 153, will flash 61 times. The decoder of FIG. 10 is arranged to respond to the odd number of flashes.

The electronics of FIG. 10 can be inserted into a "gun" or other suitable configuration and therefore be easily handled.

Referring now to FIG. 10, initially pressing a reset switch 142 sets the equipment. Reset switch 142 is a double pole single throw switch. The modulation from the coded symbol incident at a photocell 136 is supplied via a buffer amplifier 137, and an amplifier and pulse shaper 138 to a flip-flop 139 which is triggered. The output from flip 139 is applied via a buffer amplifier 141 to a lamp 140 which will light with a steady glow until reset indicating the correct answer was chosen.

If an incorrect answer was chosen, the lamp will flicker for a time equal to the time the symbol (152, 154, 155) is being modulated and then will go out.

To go to the next question, the decoder is returned to its starting position by operating reset switch 142. Note: initially reset switch had to be depressed so that the flip-flop would be in the proper state to provide a steady output to the lamp when photocell 139 receives an odd number of cycles.

To operate the circuit of FIG. 10 in its target shooting mode, a switch 145 is switched to the alternate contacts 146, 147.

In this mode, (see FIG. 1C) a "target" dot 148 is supplied by the cooperative station which also could supply background scenery for aesthetic purposes. When the "gun" 27 (FIG. 1C) is aimed at the target 148 and the trigger (switch 144 FIG. 10) is depressed, photocell 136 will supply an output via buffer amplifier 137 and buffer amplifier and pulse shaper 138 to the gate electrode of a silicon controlled rectifier 149 which causes SCR 149 to fire and light lamp 140. Switch 142 also resets SCR 149 turning off lamp 140.

Figure 1E:
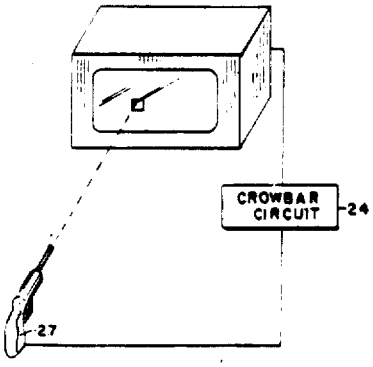

FIG. 1E illustrates an alternate embodiment to that described above. The output from the target shooter is applied to a crowbar circuit 24 the output of which is applied to antenna terminals 19 such that the screen 18 will also flash white when a "hit" is made.

The principles hereinabove set forth apply with equal strength to both monochrome and color applications. While the system that has been described has been basically for monochrome television sets, the provisions for color operation have been described and may be applied to games utilizing the aspects of the ability to adjust or change the background color. Thus, it can be seen that a game such as roulette may be played having for its object the guessing of the color that will appear when the wheel stops spinning. Very readily the system can be used to indicate a hit in the target game both by the disappearance of the square and by the change in background color. These are but a few of the countless variations that may be applied to this concept.

The number and variations of games which may be played are limited only by the imagination of the players. Some of the games which may be played are overlay games, target shooting games, chase games and color games.

FIG. 2 illustrates one type of overlay games, namely a modified checkerboard game. One player tries to move his "dot" $20_1$ from A to B while the other player tries to move his "dot" $20_2$ from B to A. The "dots" may be moved orthonogally only and only one square at a time. It is one object of this game to avoid checkmate. Other overlay games will be readily apparent.

Another type game is a chase game. For example, a fox hunt can be simulated. This requires 3 players, a hunter, a fox and a score keeper. The hunter tries to catch the fox (indicated by the fox's "dot" disappearing within a specified time. Numerous variations on this game are also possible with and without overlay patterns.

If the receiver employed is a color receiver then color games may be played. For example, an inertia wheel may be put on the shaft of potentiometer 116 in the chroma generator. The object of the game is for a player to guess the color which will appear when the wheel is spun.

The target shooting game is yet another game which is applicable to this invention. One player may manually move a "dot" while another tries to "hit" the "dot" with the photocell gun. Alternatively, the target may be automatically moved by, for example, driving the biasing voltage for the delay and pulse-forming circuit in a "dot" generator with a variable voltage source.

It [should also be understood that the principles are not to be limited only to the gaming aspects but may be applied in the areas of scientific, educational, clinical and other applications. Hence, it] is to be understood that the embodiments shown are to be regarded as illustrative only, and that many variations and modifications may be made without departing from the principles of the invention herein disclosed and defined by the appended claims.

I claim:

[1. In combination with a standard television receiver, apparatus for generating "dots" upon the screen of the receiver to be manipulated by a participant, comprising:

a control unit for generating signals representing the "dots" to be displayed, said control unit further including means for generating synchronizing signal to synchronize the television raster scan of said receiver and means for manipulating the position of the "dots" on the screen of said receiver; and means for directly coupling the generated signals only to said television receiver whereby said "dots" are displayed only upon the screen of said receiver being viewed by the participant.]

[2. The combination of claim 1 wherein said control unit includes:

a horizontal sync generator;

a vertical sync generator;

at least one dot generator coupled to said horizontal and vertical sync generators;

means for generating an rf signal; and means for modulating said rf signal with an output signal from said dot generator, said modulated rf signal being coupled to said television receiver.]

[3. The combination of claim 2 wherein said horizontal sync generator includes an astable multivibrator and said vertical sync generator includes as astable multivibrator.]

[4. The combination of claim 2 wherein said "dot" generator includes horizontal and vertical delays and an AND gate coupling the outputs from said delays.]

[5. The combination of claim 2 wherein said means for generating a modulated rf signal includes:

means for summing the signal outputs from said horizontal sync generator, said vertical sync generator and said dot generator to provide a video signal; and means for modulating the video signal with a carrier signal the frequency of which is selected in accordance with which channel of the television receiver the "dots" are to be displayed.]

[6. The combination of claim 2 wherein said dot generator includes means for varying the position of the generated "dots" on the television receiver screen.]

[7. The combination of claim 2 wherein said control unit includes first and second dot generators coupled to said vertical sync generator and said horizontal sync generator.]

[8. The combination of claim 7 wherein said means for generating a modulated rf signal includes:

means for summing the signal outputs from said horizontal sync generator, said vertical sync generator and said first and second dot generators to provide a video signal; and means for modulating the video signal with a carrier signal the frequency of which is selected in accordance with which channel of the television receivers the "dot" are to be displayed.]

[9. The combination of claim 8 wherein each of said dot generators includes means for varying the position of the generated "dots" on the television receiver screen.]

[10. The combination of claim 9 wherein said position varying means includes a control for varying the vertical position of each generated "dot" and a control for varying the horizontal position of each generated "dot".]

[11. The combination of claim 9 wherein said position varying means includes one control for varying the horizontal and vertical position of each generated "dot."]

[12. The combination of claim 11, said control being a joystick.]

[13. The combination of claim 9, further including means for denoting coincidence when a "dot" generated by one of said dot generators is located in the same position on the television screen as a "dot" generated by another of said dot generators.]

[14. The combination of claim 13 wherein said coincidence denoting means includes a coincidence detector and crowbar circuit coupled to said first and second dot generators such that coincidence of position of said "dots" will be indicated by having said first dot generator turned off causing disappearance on the screen of the television receiver of its respective "dot."]

15. The combination of claim [14] *50* wherein said coincidence detector and crowbar circuit includes a semiconductor switch and means for turning on said switch when a signal is received simultaneously from said first and second dot generators.

16. The combination of claim [14] *50*, further including means for resetting said coincidence denoting means after the "dots" are made noncoincident.

17. The combination of claim [14] *50*, further including means operatively responsive to *the presence of* a displayed "dot" *at a location upon said screen of said receiver.*

18. The combination of claim 17, wherein said means responsive includes:

means for sensing light; and means for actuating said coincidence denoting means when said light sensing means detects a "dot" displayed on the television receiver screen.

19. The combination of claim 18 wherein said actuating means includes a switch which couples the output from said light sensing means to said coincidence denoting means.

20. The combination of claim 19 wherein said light sensing means is a photosensitive element arranged within the barrel of a toy gun.

[21. The combination of claim 14 in which said television receiver is a color receiver, said combination further including a chroma generator having inputs from said horizontal sync generator and said coincidence denoting means and an output to said signal summing means, such that coincidence will also be indicated by a changing of background color of said television receiver screen.]

22. The combination of claim [21] *48* wherein said chroma generator includes a control for varying the background color of the television receiver screen.

23. The combination of claim 22 further including a wheel coupled to said control for varying background color which when spun will cause the background color to be of non-predetermined selection.

[24. The combination of claim 1, further including an overlay mask attached to the television receiver screen, said overlay mask having a predetermined pattern thereon.]

[25. The combination of claim 1, further including means for automatically moving said "dots" about said television screen.]

26. [The] *In* combination [of claim 25, further including] *with a raster scan home television receiver previously employed only for passive viewing of programs, apparatus for adding active home entertainment capability to the home television receiver by generating "dots" upon the screen of the receiver to be manipulated by a participant, comprising:*

*a control unit for generating signals representing the "dots" to be displayed, said control unit further including means for generating synchronizing signals to synchronize the television raster scan of said receiver, means for manipulating the position of at least one of the "dots" on the screen of said receiver to play amusement games and means for permitting alternate movement of said "dots" wherein said alternate movement means includes means for automatically moving at least one of said "dots" about said television screen;*

*means for directly coupling the generated signals only to said television receiver, wherein the receiver is also adapted to receive broadcast television signals, whereby said "dots" are displayed only upon the screen of said receiver being viewed by the participant; and* means for "shooting" at said moving "dots", said "shooting" means including light responsive means responsive *only* to a displayed "dot" *when aligned*

*therewith and disposed a substantial distance from the television screen when playing a shooting game thereby simulating actual target shooting, said light responsive means not being responsive to the television raster scan of said receiver except where the raster is modulated to display a dot.*

27. [The] *In* combination [of claim 1, further including] *with a raster scan home television receiver, apparatus for permitting the playing of amusement games on the screen of the television receiver by generating "dots" upon the screen of the receiver to be manipulated by a participant, comprising:*

*a control unit for generating signals representing the "dots" to be displayed, said control unit further including means for generating synchronizing signals to synchronize the television raster scan of said receiver and means for manipulating the position of the "dots" on the screen of said receiver;*

*means for directly coupling the generated signals only to said television receiver wherein the receiver is also adapted to receive broadcast television signals, whereby said "dots" are displayed only upon the screen of said receiver being viewed by the participant; and* and means for "shooting" at said "dots," said "shooting" means including light responsive means responsive *only* to a displayed "dot" when aligned therewith *and disposed a substantial distance from the television screen when playing a shooting game thereby simulating actual target shooting, said light responsive means not being responsive to the television raster scan of said receiver except where the raster is modulated to display a dot.*

[28. Television gaming apparatus as defined in claim 27, further including means for causing one of said "dots" to disappear when said "shooting" means receives light from a displayed "dot".]

[29. Television gaming apparatus as defined in claim 27 in which said television receiver is a color receiver, further including means for causing the background color of said television screen to change color when a "hit" is made.]

[30. The combination of claim 27 wherein said light responsive means includes a photocell.]

[31. The combination of claim 1, further including means for receiving background information generated on the television receiver screen by a cooperative television station.]

[32. In combination with a standard television receiver including horizontal and vertical deflection circuitry which is synchronized with horizontal and vertical synchronization signals, apparatus for generating "dots" upon the screen of the receiver to be manipulated by a participant, comprising:

a control unit responsive to the horizontal and vertical synchronization signals for generating signals representing "dots" to be displayed, including means for manipulating the position of the "dots" on the screen of the receiver; and means for directly coupling the generated signals only to said television receiver whereby said "dots" are displayed only upon the screen of said receiver being viewed by the participant.]

[33. The combination of claim 32, further including:

means for receiving information generated by a cooperative television station; and means for applying the received information to said television receiver to be displayed thereby.]

[34. The combination of claim 33 wherein said applying means includes means for modulating said received information by said generated signals.]

[35. The combination of claim 34 wherein said modulating means includes means for momentarily causing a reduction of signal strength of said received information when generated signals are being applied, whereby the generated "dots" are displayed at their particular position of the screen in place of the received information.]

[36. The combination of claim 33, further including means synchronizing the generated signals with the received information.]

[37. The combination of claim 36 wherein said synchronizing means includes:

means for receiving a horizontal scan signal generated by the television station; and means for detecting a vertical synchronizing component provided on the screen of the television receiver.]

[38. The combination of claim 37 wherein said means for receiving a horizontal scan signal includes a pickup coil and said means for detecting a vertical synchronizing component includes a photocell.]

[39. The combination of claim 36 wherein said synchronizing means is mechanically coupled to the television screen.]

[40. Apparatus for generating "dots" upon the screen of a television receiver to be manipulated by a participant, comprising:

a control unit for generating signals representing the "dots" to be displayed, said control unit further including means for generating synchronizing signals to synchronize a television raster scan of a receiver and means for manipulating the position of the "dots" on the screen; and means for directly coupling the generated signals only to a single television receiver whereby said "dots" are displayed only upon the screen of the single receiver being viewed by the participant].

41. Apparatus [as in claim 40, further including] *for permitting the playing of amusement games on the screen of a raster scan home television receiver by generating "dots" upon the screen of the raster scan television receiver to be manipulated by a participant, comprising:*

*a control unit for generating signals representing the "dots" to be displayed, said control unit further including means for generating synchronizing signals to synchronize a television raster scan of a receiver and means for manipulating the position of the "dots" on the screen;*

*means for directly coupling the generated signals only to a single television receiver, wherein the receiver is also adapted to receive broadcast television signals, whereby said "dots" are displayed only upon the screen of the single receiver being viewed by the participant; and* means for "shooting" at said "dots", said means including light responsive means responsive *only* to a displayed "dot[.]" *when aligned therewith and disposed a substantial distance from the television screen when playing a shooting game thereby simulating actual target shooting, said light responsive means not being responsive to the television raster scan of said receiver except where the raster is modulated to display a dot.*

42. [The] *In* combination [of claim 1 wherein said control unit includes] *with a standard raster scan home television receiver, apparatus for generating "dots" upon the*

*screen of the receiver to be manipulated by a participant, comprising:*

*a control unit for generating signals representing the "dots" to be displayed wherein said control unit includes means for generating synchronizing signals to synchronize the television raster scan of said receiver comprising* means for providing horizontal sync signals[;] *and* means for providing vertical sync signals;

a first RC network coupled to said means for providing horizontal sync signals;

a second RC network coupled to said means for providing vertical sync signals;

a first transistor coupled to said first RC network;

a second transistor coupled to said second RC network;

first pulse shaping means coupled to the output of said first transistor;

second pulse shaping means coupled to the output of said second transistor; [and]

an AND gate coupled to said first and second pulse shaping means*;*

*means for manipulating the position of the "dots" on the screen of said receiver; and*

*means for directly coupling the generated signals only to said television receiver whereby said "dots" are displayed only upon the screen of said receiver being viewed by the participant.*

[43. The combination of claim 1 wherein at least two "dots" are displayed on the screen of said receiver.]

[44. Apparatus for use within a television receiver, which receiver includes horizontal and vertical deflection circuitry which is synchronized with horizontal and vertical synchronizing signals, said apparatus including means for generating "dots" upon the screen of said receiver to be manipulated by a participant, comprising:

a control unit responsive to the horizontal and vertical synchronizing signals for generating signals representing "dots" to be displayed, including means for manipulating the position of the "dots" on the screen of said receiver whereby said "dots" are displayed only upon the screen of said receiver.]

[45. Apparatus as in claim 44 wherein said horizontal and vertical synchronization signals are received from a television station.]

[46. Apparatus as in claim 45 wherein said received synchronization signals are the standard synchronization signals generated by the television station.]

*47. Apparatus for adding active home entertainment capability to a home raster scan television receiver previously employed only for the passive viewing of programs by permitting the playing of games on the screen of the television receiver by at least one participant and generating "dots" upon the screen of the television receiver to be manipulated by a participant, said apparatus comprising: a control for generating signals representing the "dots to be displayed, said control unit further including means for generating horizontal and vertical synchronizing signals to synchronize a television raster scan of a receiver, means for generating first signals representing the horizontal position of said "dots", means for generating second signals representing the vertical position of said "dots", means for manipulating the position of the "dots" on the screen for playing amusement games, and AND gate circuitry for AND gating selected ones of said first and second signals representing two of said dots for detecting coincidence of said two dots; and*

*means for directly and selectively coupling the generated signals representing the dots to be displayed and the synchronizing signals only to a single television receiver whereby in a first state said "dots" are displayed only upon the screen of the single receiver being viewed by the participant and in a second state such television receiver is capable of receiving broadcast television signals.*

*48. In combination with a standard raster scan home color television receiver, apparatus for generating "dots" upon the screen of the receiver to be manipulated by a participant, comprising:*

*a control unit for generating signals representing the "dots" to be displayed, said control unit further including means comprising a horizontal sync generator and a vertical sync generator for generating synchronizing signals to synchronize the television raster scan of said receiver, first and second dot generators coupled to said vertical sync generator and said horizontal sync generator and each including means for manipulating and varying the position of the generated "dots" on the television receiver screen, means for denoting coincidence when a "dot" generated by one of said dot generators is located in the same position on the television screen as a "dot" generated by another of said dot generators, and a chroma generator having inputs from said horizontal sync generator and said coincidence denoting means, said coincidence denoting means including a coincidence detector and crowbar circuit coupled to said first and second dot generators such that coincidence of position of said "dots" will be indicated by having said first dot generator turned off causing disappearance on the screen of the television receiver of its respective "dot" and such that coincidence will also be indicated by a changing of background of color of said television receiver screen;*

*means for generating an rf carrier signal of desired frequency; and*

*means for modulating said rf carrier signal with an output signal from said dot generators including means for summing the signal outputs from said horizontal sync generator, said vertical sync generator, said chroma generator and said first and second dot generators to provide a video signal, and means for modulating the video signal onto said carrier signal the frequency of which is selected in accordance with which channel of the television receiver the "dots" are to be displayed, said modulated rf signal being coupled to said television receiver; and*

*means for directly coupling the generated signals only to said television receiver whereby said "dots" are displayed only upon the screen of said receiver being viewed by the participant.*

*49. In combination with a standard raster scan home color television receiver, apparatus for generating "dots" upon the screen of the receiver to be manipulated by a participant, comprising:*

*a control unit for generating signals representing the "dots" to be displayed, said control unit further including means for generating synchronizing signals to synchronize the television raster scan of said receiver and means for manipulating the position of the "dots" on the screen of said receiver;* means for directly coupling the generated signals only to said television receiver, wherein the receiver is also adapted to receive broadcast television signals, whereby said "dots" are displayed only upon the screen of said receiver being viewed by the participant;

*means for "shooting" at said "dots," said "shooting" means including light responsive means responsive only to a displayed "dot" when aligned therewith and disposed a substantial distance from the television screen when playing a shooting game thereby simulating actual target shooting, and said light responsive means not being responsive to the television raster scan of said receiver except where the raster is modulated to display a dot; and*

*means for causing the background color of said television screen to change color when a "hit" is made.*

*50. In combination with a standard raster scan home television receiver, apparatus for generating "dots" upon the screen of the receiver to be manipulated by a participant, comprising:*

*a control unit for generating signals representing the "dots" to be displayed, said control unit further including means comprising a horizontal sync generator and a vertical sync generator for generating synchronizing signals to synchronize the television raster scan of said receiver, first and second dot generators coupled to said vertical sync generator and said horizontal sync generator and each including means for manipulating and varying the position of the generated "dots" on the television receiver screen and*

*means for denoting coincidence when a "dot" generated by one of said dot generators is located in the same position on the television screen as a "dot" generated by another of said dot generators, said coincidence denoting means including a coincidence detector and crowbar circuit coupled to said first and second dot generators such that coincidence of position of said "dots" will be indicated by having said first dot generator turned off causing disappearance from the screen of the television receiver or its respective "dot";*

*means for generating an rf carrier signal; and*

*means for modulating said rf carrier signal with an output signal from said dot generators including means for summing the signal outputs from said horizontal sync generator, said vertical sync generator and said first and second dot generators to provide a video signal and means for modulating the video signal onto said rf carrier signal the frequency of which is selected in accordance with which channel of the television receiver the "dots" are to be displayed, said modulated rf signal being coupled to said television receiver; and*

*means for directly coupling the generated signals only to said television receiver whereby said "dots" are displayed only upon the screen of said receiver being viewed by the participant.*

*51. In combination with a standard raster scan home television receiver including horizontal and vertical deflection circuitry which is synchronized with horizontal and vertical synchronization signals, apparatus for generating "dots" upon the screen of the receiver to be manipulated by a participant, comprising:*

*a control unit responsive to the horizontal and vertical synchronization signals for generating signals representing "dots" to be displayed, including means for manipulating the position of the "dots" on the screen of the receiver;*

*means for directly coupling the generated signals only to said television receiver where said "dots" are displayed only upon the screen of said receiver being viewed by the participant;*

*means for receiving information generated by a cooperative television station and for applying the received information to said television receiver to be displayed thereof; and*

*means synchronizing the generating signals with the received information, said synchronizing means including means for receiving a horizontal scan signal generated by a television station including a pickup coil and means for detecting a vertical synchronization component provided on the screen of a television receiver including a photocell.*

*52. In combination with a raster scan home television receiver, apparatus for permitting the playing of amusement games on the screen of the television receiver by generating "dots" upon the screen of the receiver to be manipulated by a participant, comprising:*

*a control unit for generating signals representing the "dots" to be displayed, said control unit further including means for generating synchronizing signals to synchronize the television raster scan of said receiver and means for manipulating the position of the "dots" on the screen of said receiver;*

*means for directly coupling the generated signals only to said television receiver, wherein the receiver is also adapted to receive broadcast television signals whereby said "dots" are displayed only upon the screen of said receiver being viewed by the participant;*

*means for "shooting at said "dots", said "shooting" means including light responsive means responsive only to a displayed "dot" when aligned therewith and disposed a substantial distance from the television screen when playing a shooting game thereby simulating actual target shooting, said light responsive means not being responsive to the television raster scan of said receiver except where the raster is modulated to display a dot; and*

*means for causing one of said "dots" to disappear when said "shooting" means receives light from a displayed "dot".*

* * * * *